US005219549A

United States Patent [19]

Onda et al.

[11] Patent Number: 5,219,549

[45] Date of Patent: Jun. 15, 1993

[54] BLEACHING DETERGENT COMPOSITION

[75] Inventors: Masayoshi Onda, Yokkaichi; Akira Ito, Kashiwa; Yasuo Hiro, Suzuka; Kenji Umehara, Yotsukaido; Yuji Yoneyama, Funabashi, all of Japan

[73] Assignees: Mitsubishi Gas Chemical Company, Inc.; Lion Corporation, both of Tokyo, Japan

[21] Appl. No.: 696,477

[22] Filed: May 6, 1991

[30] Foreign Application Priority Data

May 25, 1990 [JP] Japan .................................. 2-134108

[51] Int. Cl.[5] .............................................. C01B 31/00

[52] U.S. Cl. .................................. 423/415 P; 252/99; 252/94; 252/186.27

[58] Field of Search ...................... 252/99, 174.13, 94, 252/186.27; 427/213, 215; 423/415 P

[56] References Cited

U.S. PATENT DOCUMENTS 3,154,496 11/1964 Roald .................................... 252/99
4,117,087 9/1978 Dillenburg et al. ............. 423/415 P
4,194,025 5/1980 Klebe et al. ......................... 427/215
4,321,301 3/1982 Brichard et al. ...................... 252/99
4,526,698 7/1985 Kuroda et al. ........................ 252/99

FOREIGN PATENT DOCUMENTS 2800916 7/1978 Fed. Rep. of Germany .
59-193999 11/1984 Japan .
1575792 10/1980 United Kingdom .

OTHER PUBLICATIONS

Chemical Abstracts vol. 102 (1985), p. 86 (97329z).

*Primary Examiner*—Olik Chaudhuri
*Assistant Examiner*—C. Everhart
*Attorney, Agent, or Firm*—Armstrong, Westerman, Hattori, McLeland & Naughton

[57] ABSTRACT

A bleaching detergent composition is disclosed which contains granulated sodium percarbonate incorporated therein formed by separately spraying an aqueous boric acid solution and an aqueous alkali metal silicate solution onto sodium percarbonate particles kept in a fluidized state to coat the sodium percarbonate particles with an aqueous solution of the boric acid and the alkali metal silicate.

5 Claims, No Drawings

BLEACHING DETERGENT COMPOSITION

BACKGROUND OF THE INVENTION

The present invention relates to a bleaching detergent composition containing sodium percarbonate incorporated therein.

Detergents for clothing with a bleaching effect have been used by preference in recent years because they can effectively remove the dirt of sebum adhered to clothing as well as the dirt of stains caused by black tea, coffee, fruits, blood, etc.

Bleaching agents may be divided into oxygen-base ones and chlorine-base ones. The former are in wider use because they do not cause fading even when applied to colored clothing or clothing with patterns and have no offensive smell, of which sodium percarbonate is a representative one.

However, sodium percarbonate has several disadvantages. It is poor in storage stability as compared with other oxygen-base bleaching agents such as sodium perborate, etc. and tends to undergo decomposition during storage to reduce its effective oxygen content. This tendency is particularly marked when sodium percarbonate is incorporated into detergents for clothing. Further, with the recent trend toward eliminating phosphorus-containing ingredients from household detergents, zeolite is generally incorporated as a builder to such detergents. This causes the problem of the decomposition of sodium percarbonate being promoted by the catalytic action of zeolite.

Accordingly, it has been eagerly awaited to develop a technique which can improve the storage stability of sodium percarbonate when incorporated into detergents and to develop a bleaching detergent composition excellent in storage stability.

A known method of stabilizing sodium percarbonate is to coat it with paraffin, polyethylene glycol, borates, (Japanese Patent Application Kokoku (Post-Exam. Publn.) No. S61-4879), boric acid, silicates, perborates, pyrophosphates, etc.

Another proposed method is, in preparing sodium percarbonate, to add phosphates, silicates, ethylenediaminetetraacetate, nitrilotriacetate, etc. as a stabilizer in the hydrogen peroxide solution used in the preparation.

However, even the sodium percarbonate obtained by the above-mentioned methods does not show a fully satisfactory storage stability when incorporated into detergent compositions.

A known method of coating sodium percarbonate with boric acid is that disclosed in British Patent No. 1,575,792. However, sodium percarbonate simply coated with boric acid is not fully satisfactory in its stability, and a further improvement of the stability is desired.

The present inventors have made extensive study to improve the storage stability of sodium percarbonate when incorporated into detergents. As a result, it has been found that when sodium percarbonate is coated with boric acid and an alkali metal silicate, an exceedingly highly stabilized sodium percarbonate can be obtained as compared with that coated with boric acid alone.

British Patent No. 1,575,792 describes that the coating agent may contain, besides boric acid, compounds which have an effect of stabilizing peroxides, and particularly mentions alkali metal salts of phosphoric acid and silicic acid as the example of such compounds; but it describes nothing of the specific coated products or the method for coating. Japanese Patent Application Kokai (Laid-open) No. S59-193,999 discloses a bleaching detergent composition incorporated with a sodium percarbonate whose surface has been coated with a coating agent containing at least both a boric acid salt and an alkali metal silicate, and describes the use of boric acid and sodium silicate in combination in its Comparative Example; but it gives no detailed description of the method for practicing it, and the effect of said combined use is not remarkable.

In coating sodium percarbonate with boric acid and an alkali metal silicate, if boric acid and the alkali metal silicate are dissolved together in a solvent such as water, a gel-like precipitate of silicon oxide may be formed though depending on the mixing ratio or the concentration. This phenomenon is particularly marked at high concentrations. In dissolving boric acid and an alkali metal silicate together, therefore, it is not always possible to adopt any composition and any solution concentration of the coating agent as desired.

In producing a stabilizing sodium percarbonate by spraying an aqueous solution of boric acid and an alkali metal silicate onto sodium percarbonate particles to coat the particles therewith, when boric acid and the alkali metal silicate are dissolved together in water, silicon oxide will precipitate in the form of gel if the concentrations of the two are high, as described above (cf. Referential Example 1), and such an aqueous mixture cannot be sprayed to coat sodium percarbonate particles. Thus, when boric acid and an alkali metal silicate are dissolved together in water, the concentrations of the two should be low. However, when the concentrations are low, a large amount of thermal energy is required for drying the sodium percarbonate particles after spraying, which is uneconomical, and moreover a long time is required for the drying, leading to the decomposition loss of active oxygen in sodium percarbonate. To practice the spraying in an industrially advantageous way, therefore, the concentrations of boric acid and of the alkali metal silicate are desirably as high as possible; but sufficiently high concentrations cannot be used since, as described above, gel-like precipitate is formed if boric acid and the alkali metal silicates are dissolved together in water in high concentrations. This is a serious problem.

SUMMARY OF THE INVENTION

The present inventors have made extensive investigation on bleaching detergent compositions incorporated with granulated sodium percarbonate formed by coating sodium percarbonate with boric acid and an alkali metal silicate. As a result, it has been found out that by separately spraying an aqueous boric acid solution and an aqueous alkali metal silicate solution onto sodium percarbonate in a fluidized state, the boric acid and alkali metal silicate (these being hereinafter sometimes referred to as coating agents) can be well spread over the sodium percarbonate particles utterly without the trouble of silicon oxide being precipitated in the form of gel to make a satisfactory coating of the sodium percarbonate difficult, even when an aqueous boric acid solution and an aqueous alkali metal silicate solution respectively of a high concentration are used, and thus the stability of sodium percarbonate can be drastically improved, overcoming the above-mentioned problems. The present invention has been accomplished on the basis of the above findings. The bleaching detergent composition incorporated with the sodium percarbonate thus coated is excellent in storage stability and bleaching effect.

Thus, according to the present invention, there is provided a bleaching detergent composition which contains granulated sodium percarbonate incorporated therein formed by separately spraying an aqueous boric acid solution and an aqueous alkali metal silicate solution onto sodium percarbonate particles kept in a fluidized state to coat the particles with an aqueous solution of the boric acid and alkali metal silicate.

In the present invention, a granulated sodium percarbonate is used which has been formed by spraying an aqueous boric acid solution and an aqueous alkali metal silicate solution from separate spray nozzles simultaneously or in succession onto sodium percarbonate particles kept in a fluidized state to coat the particles with the coating agents. One of the features of the present invention is that an extremely good coating can be obtained as described above, contrary to the expectation that even if an aqueous boric acid solution of high concentration and an aqueous alkali metal silicate solution of high concentration are separately sprayed, silicon oxide would immediately precipitate in the form of gel to make a satisfactory coating difficult when the two sprayed solutions mingle with each other in the apparatus. Another feature of the present invention is that any desired solution concentrations and mixing ratio of the coating agents can be adopted utterly without the need of giving consideration to the gel-like precipitation of silicon oxide.

In the present invention, adhesion of too much coating agent solution onto the surface of sodium percarbonate is undesirable because it causes agglomeration of sodium percarbonate particles, so that it is necessary to remove excessive water from the surface of sodium percarbonate particles (this operation being hereinafter sometimes referred to as drying) simultaneously with spraying the coating agent solution onto the particles. (Generally, the moisture content on the surface of sodium percarbonate particles is preferably kept at about 0.5-4% by weight during spraying.) This aim is attained in the present invention by keeping the temperature of the sodium percarbonate particles constant and keeping the particles in a fluidized state, in other words, by introducing hot air at a predetermined temperature and a predetermined flow rate through the sodium percarbonate particles while the coating agent solutions at predetermined temperatures are being sprayed thereonto.

In the above operation, the temperature and the flow rate of the hot air, the temperatures and the spraying flow rates of the coating agent solutions, and the concentrations of the coating agents in their solutions are correlated with one another. For example, when the temperature and the flow rate of hot air are determined, the concentrations, the temperatures, and the spraying flow rates of the coating agent solutions are decided. Thus, in the present invention, the spraying of the coating agent solutions and the drying are carried out simultaneously, whereby the moisture content on the surface of sodium percarbonate particles can be controlled at an appropriate level.

DETAILED DESCRIPTION OF THE INVENTION

When spraying and drying are carried out simultaneously, they are desirably conducted so as to keep the temperature of sodium percarbonate in a predetermined range. The temperature of sodium percarbonate during spraying is 30°-100° C., preferably 35°-95° C., more preferably 40°-90° C., and most preferably 45°-90° C.

Too low a temperature of sodium percarbonate is undesirable because it causes agglomeration of sodium percarbonate particles. When the temperature of sodium percarbonate is too high, on the other hand, sodium percarbonate tends to decompose and the growth of crystals of the coating agents occurs, resulting in a poor spreadability and an insufficient coating effect.

The solvent for the boric acid and alkali silicate is selected from those in which the two are soluble. Water is most preferable among them since it dissolves the two well and is safe and inexpensive.

The concentration of boric acid can be selected as desired so long as it is not higher than the saturated solution concentration. Too low a concentration, however, is undesirable because a long time is required for drying, causing the decomposition of sodium percarbonate, and a large quantity of heat is required for drying. Too high a concentration is also undesirable because boric acid tends to deposit in piping and nozzles to cause them to be blocked. In this respect, the concentration of boric acid is preferably 10-95%, more preferably 30-90%, most preferably 50-90%, of the saturated solution concentration.

The temperature of the boric acid solution is preferably higher to increase the solubility and to facilitate drying, but too high a temperature causes the decomposition of sodium percarbonate. In this respect, the temperature of the boric acid solution is selected from the range of 10°-120° C., preferably 30°-100° C., more preferably 50°-100° C.

The solvent for boric acid and alkali metal silicates is preferably water from the viewpoint of solubility, safety and price.

The boric acid used as the coating agent may be orthoboric acid, metaboric acid, tetraboric acid, etc.

The amount of boric acid relative to sodium percarbonate of the base material is selected from the range of generally 0.3-20% by weight, preferably 0.5-10% by weight, more preferably 1-8% by weight, most preferably 2-8% by weight.

The alkali metal silicates which may be used are sodium salts such as sodium metasilicate, sodium orthosilicate, water glasses No. 1, No. 2 and No. 3, etc., potassium metasilicate, potassium orthosilicate, etc. Particularly preferred among them are water glasses No. 1, No. 2 and No. 3 because they are liquid and are convenient to use. These salts may also be used in combination thereof.

The amount of alkali metal silicates used as the coating agent is selected from the range of 0.1-10% by weight, preferably 0.2-7% by weight, most preferably 0.3-5% by weight, respectively in terms of $SiO_2$ relative to sodium percarbonate of the base material.

In addition to the coating agents described above known stabilizes such a chelating agents may also be used in combination with the coating agent.

The diameter of the coated sodium percarbonate particles is selected from the range of 100-2,000 μm, preferably 200–2,000 μm, most preferably 200–1,500 μm.

The ratio of boric acid ($H_3BO_3$) to the alkali metal silicate (in terms of $SiO_2$) is not particularly limited, but is generally selected from the range of 10:1 to 1:5, preferably 8:1 to 1:2, most preferably 5:1 to 1:1, by weight.

The sodium percarbonate coated by the method described above, the surface of the particle of which is coated uniformly with boric acid and an alkali metal silicate and has the function of interrupting decomposition-promoting substances as moisture or zeolite from sodium percarbonate, exhibits an extremely high stability when compounded into usual powdery detergents, particularly detergents containing little or no phosphorus-containing ingredient, incorporated with zeolite, and high bulk density detergents.

The bleaching detergent composition of the present invention can be obtained by powder-mixing granulated sodium percarbonate particles with detergent particles. The sodium percarbonate particles are incorporated into the bleaching detergent composition in a proportion of 1–40% by weight.

The detergent particles may contain common detergent components, for example, surface active agents as anionic surface active agents and nonionic surface active agents, aluminosilicates (i.e., zeolite) and other additives such as builders, etc. Although zeolite has a tendency to promote the decomposition of sodium percarbonate during storage, the sodium percarbonate particles of the present invention are stable even in detergent compositions incorporated with zeolite.

Anionic surface active agents which may be used are exemplified as follows.

1) Straight chain alkylbenzenesulfonic acid salts having an alkyl group of average carbon number of 8–16.
2) α-Olefinsulfonic acid salts of average carbon number of 10–20.
3) Sulfonic acid salts of fatty acid lower alkyl esters or di-salts of sulfonated fatty acids represented by the formula

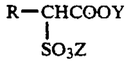

wherein R is an alkyl or alkenyl group of 4–20 carbon atoms, Y is an alkyl group of 1–3 carbon atoms or a counter ion, and Z is a counter ion.
4) Alkylsulfonic acid salts of average carbon number of 10–20.
5) Alkyl ether sulfuric acid salts or alkenyl ether sulfuric acid salts having a straight or branched alkyl or alkenyl group of average carbon number of 10–20 and having 0.5–8 moles of ethylene oxide added thereto.
6) Saturated or unsaturated fatty acid salts of average carbon number of 10–22.

The counter ions suitable in these anionic surface active agents are generally those derived from alkali metals such as sodium and potassium.

Examples of nonionic surface active agents which may be suitably used are as follows.

(1) EO-adduct type nonionic surface active agents obtainable by adding an average of 4–25 moles of ethylene oxide (EO) to primary or secondary alcohols of 8–18 carbon atoms.
(2) EO-PO-adduct type nonionic surface active agents obtainable by adding an average of 4–25 moles of ethylene oxide (EO) and an average of 3–15 moles of propylene oxide to primary or secondary alcohols of 8–18 carbon atoms.

Aluminosilicates which can be favorably used may be crystalline or amorphous aluminosilicic acid salts represented by the following formula or the mixture thereof.

$$x(M_2O \text{ or } M'O)\cdot Al_2O_3\cdot y(SiO_2)\cdot w(H_2O),$$

wherein M is an alkali metal atom; M' is an alkaline earth metal atom exchangeable with calcium; x, y and w indicate the number of moles of respective components, and in general x is 0.7–1.5, y is 1–3 and w is an any desired number.

The average particle diameter of the aluminosilicate is desirably 5 μm or less, preferably 1 μm or less, from the viewpoint of detergency.

The aluminosilicate is incorporated into the detergent composition in a proportion of 5–40% by weight, preferably 10–30% by weight.

Other additives which can be used include inorganic builders such as sodium tripolyphosphate, sodium pyrophosphate, etc.; calcium ion-catching builders such as sodium citrate, sodium ethylenediaminetetraacetate, nitrilotriacetic acid salts, sodium polyacrylate, copolymer of sodium acrylate with sodium salt of maleic anhydride, polyacetate carboxylate, etc.; alkaline builders such as carbonates, silicates, etc.; resoiling-preventing agents such as carboxymethyl cellulose, polyethylene glycol, etc.; viscosity regulating agents such as p-toluenesulfonic acid salts, toluenesulfonic acid salts, xylenesulfonic acid salts, urea, etc.; softening agents such as quaternary ammonium salts, bentonite, etc.; sodium sulfate, bleaching activating agents, enzymes, fluorescent agents, perfumes, coloring matters, etc.

Enzymes which may be used are those which have the optimum pH and the optimum temperature range under the service conditions of the detergent compositions and exhibit the enzymatic activity in washing, including hydrolase, transferase, oxydoreductase, etc., transferases as protease, lipase, amylase, cellulase, etc. being preferred.

The detergent particles of the present invention may be in various forms. For example, they may be made into detergent granules of hollow bead-like form as in conventional spray-dried detergents. They may also be made into high bulk density detergent granules in which the detergent components have been packed to the inner part of the detergent granules as disclosed in Japanese Patent Application Kokai (Laid-open) No. S60-96,698.

When the detergent compositions are made into high bulk density ones, the bulk density is preferably 0.5–1.2 g/cc. Such compositions may be prepared, as described for example in Japanese patent Application Kokai (Laid-open) Nos. S60-96,698 and S62-597, by kneading and mixing the respective components in a kneader, then disintegrating and granulating the mixture with an integrator of cutter mill type, and coating the granules with water-insoluble fine powders. Alternatively, a part or the whole of the detergent components may be supplied in the form of a spray-dried product and kneaded into the composition.

EFFECT OF THE INVENTION

By incorporation of the sodium percarbonate prepared according to the method of the present invention to form a bleaching detergent composition, the decomposition of sodium percarbonate during storage can be prevented to improve its storage stability, and the bleaching effect of the percarbonate can be fully exhibited.

Preferred Embodiments

The present invention will be described further in detail below with reference to Examples.

First, the method of evaluation used in Examples is described below.

Effective Oxygen Residual Rate

One hundred (100) grams of a bleaching detergent composition was filled in a glass bottle, which was then hermetically sealed. The bottle was then stored in a room where two conditions of 25° C.-60% RH-8 hours and 35° C. where 85% RH-16 hours were alternately repeated, for 40 days, after which the effective oxygen content of the composition was determined. The effective oxygen residual rate was calculated by the following equation to evaluate the storage stability of sodium percarbonate.

Effective oxygen residual rate (% by weight)
=[(Effective oxygen content after storage)
+(Effective oxygen content before storage)]×100

EXAMPLE 1

The respective components shown in Table 1 excluding sodium percarbonate were made up into an aqueous slurry, which was then spray-dried in a conventional manner to obtain detergent particles (bulk density: 0.33 g/cc).

Then, sodium percarbonates prepared as described below were incorporated in a proportion shown in Table 1 into the detergent particles obtained above to give bleaching detergent compositions, with which the effective oxygen residual rates were then determined. The results thus obtained are shown in Table 2.

Sodium percarbonates were prepared as described below to give present sodium percarbonates (1)-(6) and comparative sodium percarbonates (1)-(3).

Present Sodium Percarbonate (1)

On the perforated plate of a fluidized bed dryer having two spray nozzles was placed 8 kg of a sodium percarbonate of average particle diameter of 500 μm. Hot air at 100° C. was introduced from below the plate to keep the sodium percarbonate particles in a fluidized state. A 15% aqueous boric acid solution at 90° C. was sprayed at a flow rate of 80 g/min from a spray nozzle positioned 40 cm above the perforated plate, and simultaneously an aqueous water glass No. 1 solution (concentration: 15% as $SiO_2$) at 90° C. was sprayed at a flow rate of 20 g/min from a separate spray nozzle positioned 40 cm above the perforated plate. The spraying of the two solutions was continued for 33.3 minutes while the percarbonate particles were kept fluidizing with hot air. [This corresponds to a proportion of boric acid of 5.0% and that of water glass of 1.25% (as $SiO_2$) respectively relative to sodium percarbonate.]

During the period, the temperature of sodium percarbonate was kept in the range of 50°-70° C. After the spraying of the two solutions was stopped, the introduction of hot air was continued for 10 minutes further.

After cooling, the sodium percarbonate thus coated was taken out from the dryer. No agglomerate was observed at all.

Present Sodium Percarbonate (2)

A coated sodium percarbonate was prepared in the same manner as for the present sodium percarbonate (1) except for changing the concentration of the aqueous water glass No. 1 solution to 7.5% in terms if $SiO_2$. The proportion of boric acid was 5.0% and that of water glass was 0.62% respectively relative to sodium percarbonate.

Present Sodium Percarbonate (3)

The same procedures as for the present sodium percarbonate (1) were followed except that spraying was carried out as follows. A 15% aqueous boric acid solution at 90° C. was sprayed from a spray nozzle at a flow rate of 100 g/min for 26.7 minutes, and then the spraying was stopped (this corresponds to a proportion of boric acid relative to sodium percarbonate of 5.0%). Subsequently an aqueous water glass No. 1 solution (concentration: 15% as $SiO_2$) at 90° C. was sprayed from a separate spray nozzle at a flow rate of 100 g/min for 6.7 minutes [this corresponds to a proportion of water glass relative to sodium percarbonate of 1.3% (as $SiO_2$)] to obtain a coated sodium percarbonate.

Present Sodium Percarbonate (4)

The same procedures as for the present sodium percarbonate (3) were followed except that the aqueous water glass solution was sprayed first and then the aqueous boric acid solution sprayed, to obtain a coated sodium percarbonate.

Present Sodium Percarbonate (5)

The same procedures as for the present sodium percarbonate (1) were followed except that the temperature of sodium percarbonate was maintained in the range of 91°-100° C. by raising the temperature of hot air, to obtain a coated sodium percarbonate. The scanning electrophotomicrograph of the coated sodium percarbonate showed the growth of fine crystals occurring in the form of whiskers on the surface.

Present Sodium Percarbonate (6)

The same procedures as for the present sodium percarbonate (1) were followed except that the temperature of sodium percarbonate was maintained in the range of 40°-50° C. by lowering the temperature of hot air, to obtain a coated sodium percarbonate. The coated sodium percarbonate contained about 5% of agglomerates (unable to pass a 10 mesh sieve).

Comparative Sodium Percarbonate (1)

The same procedures as for the present sodium percarbonate (3) were followed except that the spraying of aqueous water glass No. 1 solution was omitted, to obtain a coated sodium percarbonate.

Comparative Sodium Percarbonate (2)

The same procedures as for the present sodium percarbonate (3) were followed except that the spraying of aqueous boric acid solution was omitted, to obtain a coated sodium percarbonate.

Comparative Sodium Percarbonate (3)

The sodium percarbonate before coating used in Example 1.

EXAMPLE 2

High bulk density granular bleaching detergent compositions (bulk density: 0.78 g/cc) having compositions shown in Table 3 were prepared.

The respective components shown in Table 3 excluding sodium percarbonate were kneaded in a kneader. Intimate-mixture pellets (2 cm cube) thus obtained and zeolite type A were fed at predetermined rates to an integrator (Speed-mill, Type ND-30, a trade names, mfd. by Okada Seiko ) and disintegrated and granulated therein.

During the time, along with the above-mentioned integration stock, a cold air at 15° C. was introduced in a proportion of 15 l/kg stock. The disintegrator was provided with disintegrating blades of 15 cm diameter in 4 cross stages and storaged at 3,000 rpm. The screen used was a punching metal having a hole diameter of 2 mm and an opening ratio of 20%.

The granulated product obtained above and zeolite type A of an average primary particle diameter of 3 μm were fed at predetermined rates in a ratio of 97:3 into a rolling drum (of a diameter D of 30 cm and length L of 60 cm) and the coated product was discharged after a retention time of 5 minutes at 30 rpm. To the high bulk density detergent particles thus obtained were powder-mixed the sodium percarbonate of Example 1 [namely, the present sodium percarbonates (1)-(6) and the comparative sodium percarbonate (1)-(3)] in proportions shown in Table 3 to obtain bleaching detergent compositions.

Effective oxygen residual rates were examined with these bleaching detergent compositions. The results are shown in Table 4.

TABLE 1

| | | Prior detergent (Bulk density 0.33 g/cc) | |
|---|---|---|---|
| | | Detergent A | Detergent B |
| Composition (wt %) | AOS-Na *1 | — | 15 |
| | LAS-Na *2 | 10 | 6 |
| | AS-Na *3 | 10 | 13 |
| | AES-Na (p = 3) *4 | 1 | — |
| | Soap *5 | 2 | 2 |
| | PEG #6000 *6 | 1 | 1 |
| | Zeolite (Type 4A) | 10 | 10 |
| | Sodium silcate | 10 | 10 |
| | Sodium carbonate | 10 | 10 |
| | Sodium percarbonate | 10 | 10 |
| | Chinopal CBS-X *7 | 0.2 | 0.2 |
| | Water | 5 | 5 |
| | Sodium sulfate | Balance | Balance |

Note:
*1 AOS-Na: Sodium α-$C_{14-18}$ olefinsulfonate
*2 LAS-Na: sodium straight ($C_{10-14}$ alkylbenzenesulfonate
*3 AS-Na: Sodium $C_{12-15}$ alkylsulfate
*4 AES-Na (p = 3): Sodium polyoxyethylene $C_{12-15}$ alkyl ether sulfate
*5 Soap: Sodium salt of $C_{14-18}$ saturated fatty acid
*6 PEG #6000: Polyethylene glycol, MW = 6,000
*7 CBS-X: Fluorescent whitening agent, (mfd. by Chiba Geigy)

TABLE 2

| | | Effective oxygen residual rate (%) | |
|---|---|---|---|
| | | Detergent A | Detergent B |
| Sodium percarbonate | Present percarbonate (1) | 77 | 79 |
| | Present percarbonate (2) | 73 | 75 |
| | Present percarbonate (3) | 75 | 75 |
| | Present percarbonate (4) | 76 | 78 |
| | Present percarbonate (5) | 68 | 69 |
| | Present percarbonate (6) | 70 | 71 |
| | Comparative percarbonate (1) | 56 | 56 |
| | Comparative percarbonate (2) | 22 | 25 |
| | Comparative percarbonate (3) | 2 | 2 |

TABLE 3

| | | High bulk density detergent (Bulk density 0.75 g/cc) | | |
|---|---|---|---|---|
| | | Detergent C | Detergent D | Detergent E |
| Composition (wt %) | α-SF-Na *1 | — | — | 15 |
| | AOS-K *2 | — | 15 | 8 |
| | LAS-K *3 | — | 20 | 3 |
| | LAS-Na *4 | 22 | — | — |
| | AS-Na *5 | 10 | — | — |
| | AES-Na (p = 3) *6 | 3 | — | — |
| | Soap *7 | 1 | 1 | 1 |
| | Nonionic surfactant *8 | 5 | 5 | 5 |
| | PEG #6000 *9 | 1 | 1 | 1 |
| | Zeolite (Type 4A) | 20 | 20 | 20 |
| | Sodium silicate | 10 | 5 | 4 |
| | Sodium carbonate | 10 | 10 | 20 |
| | Potassium carbonate | — | 5 | 5 |
| | Sodium percarbonate | 10 | 10 | 10 |
| | Tinopal CBS-X *10 | 0.2 | 0.2 | 0.2 |
| | Water | Balance | Balance | Balance |

Note:
*1 α-SF-Na: Sodium sulfonate of $C_{12-16}$ saturate fatty acid methyl ester
*2 AOS-K: Potassium α-$C_{14-18}$ olefinsulfonate
*3 LAS-Na: Sodium straight $C_{10-14}$ alkylbenzenesulfonate
*4 LAS-K: Potassium straight $C_{10-14}$ alkylbenzenesulfonate
*5 AS-Na: Sodium $C_{12-15}$ alkylsulfate
*6 AES-Na (p = 3): Sodium polyoxyethylene $C_{12-15}$ alkyl ether sulfate
*7 Soap: Sodium salt of saturated $C_{14-18}$ fatty acid
*8 Nonionic surfactant: $C_{15}$ alkyl ether ethoxylate (average number of moles of added ethylene oxide = 15)
*9 PEG #6000: Polyethylene glycol, MW = 6000
*10 Tinopal CBS-X: Fluorescent whitening agent (mfd. by Ciba Geigy)

TABLE 4

| | | Effective oxygen residual rate (%) | | |
|---|---|---|---|---|
| | | Detergent C | Detergent D | Detergent E |
| Sodium percarbonate | Present percarbonate (1) | 84 | 85 | 86 |
| | Present percarbonate (2) | 80 | 82 | 83 |
| | Present percarbonate (3) | 82 | 83 | 84 |
| | Present percarbonate (4) | 84 | 84 | 84 |
| | Present percarbonate (5) | 76 | 77 | 79 |
| | Present percarbonate (6) | 77 | 78 | 79 |
| | Comparative percarbonate (1) | 65 | 68 | 72 |
| | Comparative | 20 | 23 | 26 |

TABLE 4-continued

| | Effective oxygen residual rate (%) | | |
|---|---|---|---|
| | Detergent C | Detergent D | Detergent E |
| percarbonate (2) | | | |
| Comparative percarbonate (3) | 5 | 5 | 7 |

EXAMPLE 3

A detergent slurry of 45% solid content was prepared by using the respective components of the spray-dried detergent particle composition shown in Table 5 excluding enzymes and perfumes. The detergent slurry was dried in a counter-current type spray drying tower at a hot air temperature of 380° C. so as to attain a water content of 5%, to obtain spray-dried detergent particles.

The spray-dried detergent particles had an average particle diameter of 350 μm, a bulk density of 0.35 g/cc and also a good fluidity, the angle of repose being 45 degrees. To the detergent particles were added an enzyme, perfume, and 8% by weight or 12% by weight of the present sodium percarbonate (1) of Example 1 relative to the detergent particles, whereby bleaching detergent compositions of the present invention were obtained.

These bleaching detergent compositions were evaluated for their effective oxygen residual rate. All the compositions showed an effective oxygen residual rate of 75% or more.

TABLE 5

Composition of prior detergent particles (No. 1)

| Component | Compounding amount (wt %) |
|---|---|
| $C_{14-18}$ α-Olefinsulfonic acid salt | 10 |
| Alkylbenzenesulfonic acid salt ($C_{10-14}$ alkyl group) | 5 |
| α-Sulfofatty acid ($C_{12-16}$) methyl ester salt | 5 |
| Beef tallow fatty acid salt | 2 |
| $C_{12-13}$ Alcohol ethoxylate ($E\bar{O}p$ = 20) | 2 |
| Nonylphenol ethoxylate ($E\bar{O}p$ = 15) | 1 |
| $C_{12-13}$ Alcohol EO · PO adduct ($E\bar{O}p$ = 15, $P\bar{O}p$ = 5) | 1 |
| Zeolite Type A (average particle diameter 1.2 μm) | 15 |
| Sodium carbonate | 5 |
| JIS No. 1 Sodium silicate | 10 |
| Sodium sulfite | 1 |
| Protease (Trade name: Savinase 4.0 T) | 0.3 |
| Amylase (Trade name: Termamyl 60 G) | 0.1 |
| Cellulase (Trade name Celluzyme SP-227) | 0.1 |
| Lipase (Trade name Lipolase 80T) | 0.3 |
| Polyethylene glycol ($\bar{M}w$ = 6,000) | 1 |
| Fluorescent agent (Trade name Tinopal CBS-X) | 0.1 |
| Fluorescent agent (Trade name Whitex SKC) | 0.2 |
| Fluorescent agent (Trade name Whitex SA) | 0.2 |
| Perfume (as shown in Table A below) | 0.2 |
| Glauber's salt | Balance |

TABLE A

Perfume composition

| Component | Compounding amount (part by wt.) |
|---|---|
| 3,7-Dimethyl-1,6-octadien-3-ol | 80 |
| 3,7-Dimethyl-1,6-octadien-3-yl acetate | 60 |
| 3,7-Dimethyl-6-octen-1-ol | 40 |
| β-Phenylethyl alcohol | 50 |
| p-tert-Butyl-α-methylcinnamic aldehyde | 70 |
| α-Methyl-p-isopropylphenylpropion aldehyde | 60 |
| α-n-Amylcinnamic aldehyde | 20 |
| α-n-Hexylcinnamic aldehyde | 60 |
| 7-Acetyl-1,1,3,4,4,6-hexamethyltetrahydronaphthalene | 80 |
| 3-(5,5,6-Trimethyl-norbornan-2-yl)-cyclohexan-1-ol | 20 |
| Vertofix | 30 |
| 2-Ethyl-4-(2,2,3-trimethyl-3-cyclopenten-1-yl)-2-butan-1-ol | 10 |
| α,α-Dimethyl-p-ethylhydrocinnamic aldehyde | 40 |
| 2,4-Dimethyl-3-cyclohexene-1-carboxy aldehyde | 10 |
| cis-3-Hexenol | 10 |
| 2-trans-3,7-Dimethyl-2,6-octadien-1-ol | 30 |
| n-Decyl aldehyde | 5 |
| 10-Undecen-1-ol | 5 |
| Methylnonylacetaldehyde | 5 |
| 4-(4-Hydroxy-4-methylpentyl)-3-cyclohexene-1-carboxy aldehyde | 30 |
| Naphthalene-2-acetyl-1,2,3,4,6,7,8-octahydro-2,3,8,8-tetramethyl | 30 |
| 5-(2-Methylene-6,6-dimethyl-50 cyclohexyl)-4-penten-3-one | 50 |
| 2-Methoxy-4-propenylphenol | 20 |
| Allyl cyclohexanepropionate | 10 |
| 6,7-Dihydro-1,1,2,3,3-pentamethyl-4(5H)-indanone | 5 |
| p-Propenylphenyl methyl ether | 5 |
| Methyl 2-aminobenzoate | 5 |
| Lemon oil | 30 |
| Orange oil | 20 |
| Lavandine oil | 20 |
| Patchouli oil | 10 |
| 3,7-Dimethyl-2,6-octadienol | 30 |
| Methyl dihydrojasmonate | 50 |

EXAMPLE 4

Detergent particles Nos. 2-8 shown in Table 6 were prepared in the same manner as in Example 3 except for varying the kind and the compounding amount of anionic surface active agents or nonionic surface active agents. Then, in the same manner as in Example 3, the present sodium percarbonate (4) of Example , was added to the detergent particles prepared above in a proportion of 10% by weight or 15% by weight relative to the detergent particles to obtain bleaching detergent compositions of the present invention.

These bleaching detergent compositions were evaluated for their effective oxygen residual rate. All the compositions showed the same excellent storage stability as in Example 3.

EXAMPLE 5

Detergent particles Nos. 9-21 shown in Table 7 were prepared in the same manner as in Example 3 except for varying the kind and the compounding amount of builders. Then, in the same manner in Example 3, the present sodium percarbonate (1) of Example 1 was added to the detergent particles in a proportion of 10% by weight or 15% by weight respectively relative to the detergent particles to obtain bleaching detergent compositions of the present invention.

These bleaching detergent compositions were evaluated for their effective oxygen residual rate. All the compositions showed the same excellent storage stability as in Example 3.

EXAMPLE 6

Detergent particles Nos. 22–31 shown in Table 8 were prepared in the same manner as in Example 3 except for varying the kind and the compounding amount of enzymes or other additives. Then, in the same manner as in Example 3, the present sodium percarbonate (4) of Example 1 was added to the detergent particles in a proportion of 8% by weight or 15% by weight respectively relative to the detergent particles to obtain bleaching detergent compositions of the present invention.

These bleaching detergent compositions were evaluated for their detergency. All the compositions showed the same excellent detergency as in Example 3.

EXAMPLE 7

A detergent slurry of a solid content of 45% was prepared by using the respective components of the high bulk density detergent particle composition shown in Table 9 excluding the nonionic surface active agent, enzyme and perfume. The detergent slurry was dried in a countercurrent type spray drying tower at a hot air temperature of 380° C. so as to attain a water content of 5%, to obtain a spray-dried product.

The spray-dried product had an average particle diameter of 350 μm, a bulk density of 0.35 g/cc and also a good fluidity, the angle of repose being 45 degrees. Then, the spray-dried product, a nonionic surface active agent and water were introduced into a continuous kneader (KRC Kneader, Type #2, mfd. by Kurimoto) whereby a dense and homogenous kneaded product was obtained.

The kneader was provided at the discharge port with a perforated plate of 10 mm thickness having 80 holes of 5 mm diameter to form the kneaded product into cylindrical pellets of about 5 mm diameter and 10 mm length. The pellets, together with two times by weight of a cooling air at 15° C., were introduced into a crusher (Speed Mill Type ND-1, mfd. by Okada Seiko K. K.).

The crusher had cutters of 15 cm length in 4 cross stages, rotates at 3,000 rpm, and had a screen consisting of a 360-degree punching metal. These crushers were connected in 3 series stages, and the hole diameters of the respective stage screens were 3.5 mm for the first stage, 2 mm for the second stage, and 1.5 mm for the third stage. The particles which had passed the 3 stages of crushers were separated from cooling air and then perfume was sprayed thereto to obtain detergent particles having the composition shown in Table 9 and a bulk density of 0.8 g/cc.

Then, bleaching detergent compositions of the present invention were obtained by adding to the detergent particles obtained above an enzyme and 8% by weight or 12% by weight, respectively based on the detergent particles, of the present sodium percarbonate (1) of Example 1.

These bleaching detergent compositions were evaluated for their effective oxygen residual rate. All the compositions showed an effective oxygen residual rate of 76% or more.

EXAMPLE 8

Detergent particles Nos. 102–109 shown in Table 10 were prepared in the same manner as in Example 7 except for varying the kind and the compounding amount of the anionic surface active agent. Then, bleaching detergent compositions of the present invention were obtained by adding to the detergent particles obtained above 11% by weight or 16% by weight, respectively based on the detergent particles, of the present sodium percarbonate (4) of Example 1 in the same manner as in Example 7.

These bleaching detergent compositions were evaluated for their effective oxygen residual rate. All the compositions showed the same excellent storage stability as in Example 7.

EXAMPLE 9

Detergent particles Nos. 111–116 shown in Table 11 were prepared in the same manner as in Example 7 except for varying the kind and the compounding amount of the nonionic surface active agent. Then, bleaching detergent compositions of the present invention were obtained by adding to the detergent particles prepared above 9% by weight or 20% by weight, respectively based on the detergent particles, of the present sodium percarbonate (3) of Example 1 in the same manner as in Example 7.

These bleaching detergent compositions were evaluated for their effective oxygen residual rate. All the compositions showed the same excellent storage stability as in Example 7.

EXAMPLE 10

Detergent particles Nos. 121–130 shown in Table 12 were prepared in the same manner as in Example 7 except for varying the kind and the compounding amount of the builder. Then, bleaching detergent compositions of the present invention were obtained by adding to the detergent particles prepared above 8% by weight or 14% by weight, respectively based on the detergent particles, of the present sodium percarbonate (4) of Example 1 in the same manner as in Example 7.

These bleaching detergent compositions were evaluated for their effective oxygen residual rate. All the compositions showed the same excellent storage stability as in Example 7.

EXAMPLE 11

Detergent particles Nos. 131–134 shown in Table 13 were prepared in the same manner as in Example 7 except for varying the kind and the compounding amount of the enzyme. The bleaching detergent compositions of the present invention were obtained by adding to the detergent particles prepared above 12% by weight or 20% by weight, respectively based on the detergent particles, of the present sodium percarbonate (1) of Example 1 in the same manner as in Example 7.

These bleaching detergent compositions were evaluated for their effective oxygen residual rate. All the compositions showed the same excellent storage stability as in Example 7.

EXAMPLE 12

Detergent particles Nos. 135–142 shown in Table 14 were prepared in the same manner as in Example 7 except for varying the kind and the compounding amount of other additives. Then, bleaching detergent compositions of the present invention were obtained by adding to the detergent particles prepared above 9% by weight or 17% by weight, respectively based on the detergent particles, of the present sodium percarbonate (4) of Example 1 in the same manner as in Example 7.

These bleaching detergent compositions were evaluated for their effective oxygen residual rate. All the compositions showed the same excellent storage stability as in Example 7.

TABLE 6

Detergent Particles Nos. 2-8*

| | Component | No. 2 | 3 | 4 | 5 | 6 | 7 | 8 |
|---|---|---|---|---|---|---|---|---|
| Anionic | α-$C_{14-18}$ Olefinsulfonate | 10 | 10 | 10 | 10 | 10 | 10 | 10 |
| | Alkylbenzenesulfonate ($C_{10-14}$ alkyl group) | 10 | 5 | 5 | 5 | 5 | 5 | 5 |
| | $C_{12-16}$ Alkylsulfate | — | 5 | — | — | — | — | — |
| | $C_{12-16}$ Alkylethoxy($EO\bar{p}$ = 3) sulfonate | — | — | 5 | — | — | — | — |
| | Sulfofatty acid ($C_{12-16}$) methyl ester salt | — | — | — | — | 5 | 5 | 5 |
| | $C_{12-14}$ Alkylsulfonate | — | — | — | 5 | — | — | — |
| | Beef tallow fatty acid salt | 2 | 2 | 2 | 2 | 2 | 2 | 2 |
| Nonionic | $C_{12-13}$ Alcohol ethoxylate ($EO\bar{p}$ = 20) | 2 | 2 | 2 | 2 | 2 | — | — |
| | Nonylphenol ethoxylate ($EO\bar{p}$ = 15) | 1 | 1 | 1 | 1 | — | 2 | — |
| | $C_{12-13}$ Alcohol EO · PO adduct $EO\bar{p}$ = 15, $PO\bar{p}$ = 5 | 1 | 1 | 1 | 1 | — | — | 2 |
| Builder | Zeolite Type A (average particle diameter 1.2 μm) | 15 | 15 | 15 | 15 | 15 | 15 | 15 |
| | Sodium carbonate | 5 | 5 | 5 | 5 | 5 | 5 | 5 |
| | JIS No. 1 Sodium silicate | 10 | 10 | 10 | 10 | 10 | 10 | 10 |
| Enzyme | Protease (Trade name Savinase 4.0T) | 0.3 | 0.3 | 0.3 | 0.3 | 0.3 | 0.3 | 0.3 |
| | Amylase (Trade name Termanyl 60G) | 0.1 | 0.1 | 0.1 | 0.1 | 0.1 | 0.1 | 0.1 |
| | Cellulase (Trade name Celluzyme SP-227) | 0.1 | 0.1 | 0.1 | 0.1 | 0.1 | 0.1 | 0.1 |
| | Lipase (Trade name Lipolase 30T) | 0.3 | 0.3 | 0.3 | 0.3 | 0.3 | 0.3 | 0.3 |
| Other additive | Polyethylene glycol ($M\bar{w}$ = 6,000) | 1 | 1 | 1 | 1 | 1 | 1 | 1 |
| | Sodium sulfite | 1 | 1 | 1 | 1 | 1 | 1 | 1 |
| | Fluorescent agent (trade name Tinopal CBS-X) | 0.1 | 0.1 | 0.1 | 0.1 | 0.1 | 0.1 | 0.1 |
| | Fluorescent agent (Trade name Whitex SKC) | 0.2 | 0.2 | 0.2 | 0.2 | 0.2 | 0.2 | 0.2 |
| | Fluorescent agent (Trade name Whitex SA) | 0.2 | 0.2 | 0.2 | 0.2 | 0.2 | 0.2 | 0.2 |
| | Perfume (as shown in Table A before) | 0.1 | 0.1 | 0.1 | 0.1 | 0.1 | 0.1 | 0.1 |
| | Glauber's salt | | | | Balance | | | |

Note:
*Numberical values in the Table indicate compounding amounts (in % by weight)

TABLE 7

Detergent Particles Nos. 9-21*

| | Component | No. 9 | 10 | 11 | 12 | 13 | 14 | 15 | 16 | 17 | 18 | 19 | 20 | 21 |
|---|---|---|---|---|---|---|---|---|---|---|---|---|---|---|
| Anionic | α-$C_{14-18}$ Olefinsulfonate | 10 | 10 | 10 | 10 | 10 | 10 | 10 | 10 | 10 | 10 | 10 | 10 | 10 |
| | Alkylbenzenesulfonate ($C_{10-14}$ alkyl group) | 5 | 5 | 5 | 5 | 5 | 5 | 5 | 5 | 5 | 5 | 5 | 5 | 5 |
| | α-Sulfofatty acid ($C_{12-16}$) methyl ester salt | 5 | 5 | 5 | 5 | 5 | 5 | 5 | 5 | 5 | 5 | 5 | 5 | 5 |
| | Beef tallow fatty acid salt | 2 | 2 | 2 | 2 | 2 | 2 | 2 | 2 | 2 | 2 | 2 | 2 | 2 |
| Nonionic | $C_{12-13}$ Alcohol ethoxylate ($EO\bar{p}$ = 20) | 2 | 2 | 2 | 2 | 2 | 2 | 2 | 2 | 2 | 2 | 2 | 2 | 2 |
| | Nonylphenol ethoxylate ($EO\bar{p}$ = 15) | 1 | 1 | 1 | 1 | 1 | 1 | 1 | 1 | 1 | 1 | 1 | 1 | 1 |
| | $C_{12-13}$ Alcohol EO · PO adduct ($EO\bar{p}$ = 15, $PO\bar{p}$ = 5) | 1 | 1 | 1 | 1 | 1 | 1 | 1 | 1 | 1 | 1 | 1 | 1 | 1 |
| Builder | Zeolite Type A (average particle diameter 1.2 μm) | 15 | 10 | 10 | 10 | 10 | 10 | 10 | 15 | 10 | — | 15 | 15 | 15 |
| | Sodium citrate | — | 5 | — | — | — | — | — | — | — | — | — | — | — |
| | Trisodium nitrilotriacetate | — | — | 5 | — | — | — | — | — | — | — | — | — | — |
| | Tetrasodium ethylenediaminetetraacetate | — | — | — | 5 | — | — | — | — | — | — | — | — | — |
| | Sodium polyacrylate ($M\bar{w}$ = 5,000) | — | — | — | — | 5 | — | — | — | — | — | — | — | — |
| | Maleic acid/ethylene copolymer ($M\bar{w}$ = 10,000) | — | — | — | — | — | 5 | — | — | — | — | — | — | — |
| | α-Sulfofatty acid ($C_{16-18}$) disodium | — | — | — | — | — | — | 5 | — | — | — | — | — | |
| | Sodium carbonate | 5 | 5 | 5 | 5 | 5 | 5 | 5 | 5 | 5 | 5 | 5 | 5 | 5 |
| | JIS No. 1 Sodium silicate | 10 | 10 | 10 | 10 | 10 | 10 | 10 | 10 | 10 | 10 | 10 | 10 | 10 |
| | Crystalline sodium phyllosilicate | — | — | — | — | — | — | — | 5 | 10 | 15 | — | — | — |
| Enzyme | Protease (Trade name Savinase 4.0T) | 0.3 | 0.3 | 0.3 | 0.3 | 0.3 | 0.3 | 0.3 | 0.3 | 0.3 | 0.3 | 0.3 | 0.3 | 0.3 |
| | Amylase (Trade name Termamyl 60G) | 0.1 | 0.1 | 0.1 | 0.1 | 0.1 | 0.1 | 0.1 | 0.1 | 0.1 | 0.1 | 0.1 | 0.1 | 0.1 |
| | Cellulase (Trade name Celluxzyme SP-227) | 0.1 | 0.1 | 0.1 | 0.1 | 0.1 | 0.1 | 0.1 | 0.1 | 0.1 | 0.1 | 0.1 | 0.1 | 0.1 |
| | Lipase (Trade name Lipolase 30T) | 0.3 | 0.3 | 0.3 | 0.3 | 0.3 | 0.3 | 0.3 | 0.3 | 0.3 | 0.3 | 0.3 | 0.3 | 0.3 |
| Other additive | Tetraacetylethylenediamine | — | — | — | — | — | — | — | — | — | — | — | 2 | — |
| | Tetramethylpiperidine hydrochloride | — | — | — | — | — | — | — | — | — | — | 2 | — | 2 |
| | Polyethylene glycol ($M\bar{w}$ = 6,000) | 1 | 1 | 1 | 1 | 1 | 1 | 1 | 1 | 1 | 1 | 1 | 1 | 1 |

TABLE 7-continued

Detergent Particles Nos. 9-21*

| Component | No. 9 | 10 | 11 | 12 | 13 | 14 | 15 | 16 | 17 | 18 | 19 | 20 | 21 |
|---|---|---|---|---|---|---|---|---|---|---|---|---|---|
| Sodium sulfite | 1 | 1 | 1 | 1 | 1 | 1 | 1 | 1 | 1 | 1 | 1 | 1 | 1 |
| Fluorescent agent (Trade name Tinopal CBS-X) | 0.1 | 0.1 | 0.1 | 0.1 | 0.1 | 0.1 | 0.1 | 0.1 | 0.1 | 0.1 | 0.1 | 0.1 | 0.1 |
| Fluorescent agent (Trade name Whitex SKC) | 0.2 | 0.2 | 0.2 | 0.2 | 0.2 | 0.2 | 0.2 | 0.2 | 0.2 | 0.2 | 0.2 | 0.2 | 0.2 |
| Flourescent agent (Trade name Whitex SA) | 0.2 | 0.2 | 0.2 | 0.2 | 0.2 | 0.2 | 0.2 | 0.2 | 0.2 | 0.2 | 0.2 | 0.2 | 0.2 |
| Perfume (as shown in Table A before) | 0.1 | 0.1 | 0.1 | 0.1 | 0.1 | 0.1 | 0.1 | 0.1 | 0.1 | 0.1 | 0.1 | 0.1 | 0.1 |
| Glauber's salt | Balance | | | | | | | | | | | | |

Note:
*Numerical values in the Table indicate compounding amounts (in % by weight).

TABLE 8

Detergent Particles Nos. 22-31*

| | Component | No. 22 | 33 | 24 | 25 | 26 | 27 | 28 | 29 | 30 | 31 |
|---|---|---|---|---|---|---|---|---|---|---|---|
| Anionic | α-$C_{14-18}$ Olefinsulfonate | 10 | 10 | 10 | 10 | 10 | 10 | 10 | 10 | 10 | 10 |
| | Alkylbenzenesulfonate ($C_{10-14}$ alkyl group) | 5 | 5 | 5 | 5 | 5 | 5 | 5 | 5 | 5 | 5 |
| | α-Sulfofatty acid ($C_{12-16}$) methyl ester salt | 5 | 5 | 5 | 5 | 5 | 5 | 5 | 5 | 5 | 5 |
| | Beef tallow fatty acid salt | 2 | 2 | 2 | 2 | 2 | 2 | 2 | 2 | 2 | 2 |
| Nonionic | $C_{12-13}$ Alcohol ethoxylate ($E\bar{O}p$ = 20) | 2 | 2 | 2 | 2 | 2 | 2 | 2 | 2 | 2 | 2 |
| | Nonylphenol ethoxylate ($EO\bar{p}$ = 15) | 1 | 1 | 1 | 1 | 1 | 1 | 1 | 1 | 1 | 1 |
| | $C_{12-13}$ Alcohol EO · PO adduct ($EO\bar{p}$ = 15, $PO\bar{p}$ = 5) | 1 | 1 | 1 | 1 | 1 | 1 | 1 | 1 | 1 | 1 |
| Builder | Zeolite Type A (average particle diameter 1.2 μm) | 15 | 15 | 15 | 15 | 15 | 15 | 15 | 15 | 15 | 15 |
| | Sodium carbonate | 5 | 5 | 5 | 5 | 5 | 5 | 5 | 5 | 5 | 5 |
| | JIS No. 1 Sodium silicate | 10 | 10 | 10 | 10 | 10 | 10 | 10 | 10 | 10 | 10 |
| Enzyme | Protease (Trade name Savinase 4.0T) | 0.3 | 0.3 | 0.3 | 0.3 | 0.3 | 0.3 | 0.3 | 0.3 | 0.3 | 0.3 |
| | Amylase (Trade name Termamyl 60G) | — | 0.3 | — | — | 0.1 | 0.1 | 0.1 | 0.1 | 0.1 | 0.1 |
| | Cellulase (Trade name Celluzyme SP-227 | — | — | 0.3 | — | 0.1 | 0.1 | 0.1 | 0.1 | 0.1 | 0.1 |
| | Lipase (Trade name Lipolase 30T) | — | — | — | 0.3 | 0.3 | 0.3 | 0.3 | 0.3 | 0.3 | 0.3 |
| Other additive | Polyethylene glycol ($\bar{M}w$ = 6,000) | 1 | 1 | 1 | 1 | — | 1 | — | — | — | — |
| | Sodium sulfite | 1 | 1 | 1 | 1 | 1 | 1 | 1 | 1 | 1 | 1 |
| | Carboxymethyl cellulose | — | — | — | — | — | — | 1 | — | — | — |
| | p-Toluenesulfonate | — | — | — | — | — | — | — | 1 | — | — |
| | Di-hardened beef tallow alkyl dimethyammonium chloride | — | — | — | — | — | — | — | — | 5 | — |
| | Smectites (Trade name: Yellow Stone) | — | — | — | — | — | — | — | — | — | 5 |
| | Fluorescent agent (Trade name Tinopal CBS-X) | 0.1 | 0.1 | 0.1 | 0.1 | 0.1 | 0.1 | 0.1 | 0.1 | 0.1 | 0.1 |
| | Fluorescent agent (Trade name Whitex SKC) | 0.2 | 0.2 | 0.2 | 0.2 | 0.2 | 0.2 | 0.2 | 0.2 | 0.2 | 0.2 |
| | Fluorescent agent (Trade name Whitex SA) | 0.2 | 0.2 | 0.2 | 0.2 | 0.2 | 0.2 | 0.2 | 0.2 | 0.2 | 0.2 |
| | Perfume (as shown in Table A before) | 0.1 | 0.1 | 0.1 | 0.1 | 0.1 | 0.1 | 0.1 | 0.1 | 0.1 | 0.1 |
| | Glauber's salt | Balance | | | | | | | | | |

Note:
*Numerical values in the Table indicate compounding amounts (in % by weight).

TABLE 9

Composition of high bulk density detergent particles (No. 1)

| Component | Compounding amount (part by wt.) |
|---|---|
| $C_{14-18}$ α-Olefinsulfonate | 10 |
| Alkylbenzensulfonate ($C_{10-14}$ alkyl group) | 10 |
| α-Sulfofatty acid ($C_{12-18}$) methyl ester salt | 10 |
| Beef tallow fatty acid salt | 2 |
| $C_{12}$—Alcohol ethoxylate ($E\bar{O}p$ = 15) | 2 |
| Nonylphenol ethoxylate (EOp = 15) | 2 |
| $C_{12-13}$ Alcohol EO · PO adduct (EOp = 15, POp = 5) | 1 |
| Coconut fatty acid dialkanol amide | 1 |
| Alkylamine oxide ($C_{12-14}$) | 1 |
| Zeolite Type A (average particle diameter 1.2 μm) | 20 |

TABLE 9-continued

Composition of high bulk density detergent particles (No. 1)

| Component | Compounding amount (part by wt.) |
|---|---|
| Sodium carbonate | 10 |
| JIS No. 1 Sodium sulfate | 10 |
| Sodium sulfite | 2 |
| Protease (Trade name Savinase 4.0T) | 0.5 |
| Amylase (Trade name Termamyl 60G) | 0.2 |
| Lipase (Trade name Lipolase 30T) | 0.3 |
| Polyethylen glycol ($\bar{M}w$ = 6,000) | 2 |
| Fluorescent Agent (Tradename Tinopal CBS-X) | 0.1 |
| Fluorescent Agent (Trade name Whitex SKC) | 0.2 |
| Fluorescent Agent (Trade name Whitex SA) | 0.2 |
| Perfume shown in Table A before) | 0.2 |
| Glauber's salt | 5 |

TABLE 10

Detergent Particles Nos. 102-109*)

| | Component | No. 102 | 103 | 104 | 105 | 106 | 107 | 108 | 109 |
|---|---|---|---|---|---|---|---|---|---|
| Anionic | $C_{14-18}$ α-Olefinsulfonate | 15 | 30 | — | — | 10 | 10 | 10 | 10 |
| | Alkylbenzenesulfonate ($C_{10-14}$ alkyl group) | 15 | — | 30 | — | 10 | 10 | 10 | 10 |
| | $C_{12-16}$ Alkylsulfate | — | — | — | 30 | 10 | — | — | — |
| | $C_{12-15}$ Alkylethoxy ($EO\bar{p}$ = 3) sulfate | — | — | — | — | — | 10 | — | — |
| | α-Sulfofatty acid ($C_{12-18}$) methyl ester salt | — | — | — | — | — | — | 10 | — |

TABLE 10-continued

Detergent Particles Nos. 102-109*)

| | Component | No. 102 | 103 | 104 | 105 | 106 | 107 | 108 | 109 |
|---|---|---|---|---|---|---|---|---|---|
| | $C_{12-14}$ Alkylsufonate | — | — | — | — | — | — | — | — |
| | Beef tallow fatty acid salt | 2 | 2 | 2 | 2 | 2 | 2 | 2 | 10 |
| Nonionic | $C_{12-13}$ Alcohol ethoxylate (EOp = 20) | 2 | 2 | 2 | 2 | 2 | 2 | 2 | 2 |
| | Nonylphenol ethoxylate (EOp = 15) | 2 | 2 | 2 | 2 | 2 | 2 | 2 | 2 |
| | $C_{12-13}$ Alcohol EO · PO adduct (EOp = 15, POp = 5) | 1 | 1 | 1 | 1 | 1 | 1 | 1 | 1 |
| | Coconut fatty acid dialkanol amide | 1 | 1 | 1 | 1 | 1 | 1 | 1 | 1 |
| Builder | Alkylamine oxide ($C_{12-14}$) | 1 | 1 | 1 | 1 | 1 | 1 | 1 | 1 |
| | Zeolite Type A (average particle diameter 1.2 μm) | 20 | 20 | 20 | 20 | 20 | 20 | 20 | 20 |
| | Sodium carbonate | 10 | 10 | 10 | 10 | 10 | 10 | 10 | 10 |
| | JIS No. 1 Sodium silicate | 10 | 10 | 10 | 10 | 10 | 10 | 10 | 10 |
| Enzyme | Protease (Trade name Savinase 4.0T) | 0.5 | 0.5 | 0.5 | 0.5 | 0.5 | 0.5 | 0.5 | 0.5 |
| | Amylase (Trade name Termamyl 60G) | 0.2 | 0.2 | 0.2 | 0.2 | 0.2 | 0.2 | 0.2 | 0.2 |
| | Lipase (Trade name Lipolase 30T) | 0.3 | 0.3 | 0.3 | 0.3 | 0.3 | 0.3 | 0.3 | 0.3 |
| Other | Polyethylene glycol (Mw = 6,000) | 2 | 2 | 2 | 2 | 2 | 2 | 2 | 2 |
| additive | Sodium sulfite | 2 | 2 | 2 | 2 | 2 | 2 | 2 | 2 |
| | Fluorescent agent (Trade name Tinopal CBS-X) | 0.1 | 0.1 | 0.1 | 0.1 | 0.1 | 0.1 | 0.1 | 0.1 |
| | Fluorescent agent (Trade name Whitex SKC) | 0.2 | 0.2 | 0.2 | 0.2 | 0.2 | 0.2 | 0.2 | 0.2 |
| | Fluorescent agent (Trade name Whitex SA) | 0.2 | 0.2 | 0.2 | 0.2 | 0.2 | 0.2 | 0.2 | 0.2 |
| | Perfume (as shown in Table A before) | 0.2 | 0.2 | 0.2 | 0.2 | 0.2 | 0.2 | 0.2 | 0.2 |
| | Glauber's salt | 5 | 5 | 5 | 5 | 5 | 5 | 5 | 5 |

Note:
*)Numerical values in the Table indicate compounding amounts (in % by weight).

TABLE 11

Detergent Particles Nos. 111-116*)

| Component | No. 111 | 112 | 113 | 114 | 115 | 116 |
|---|---|---|---|---|---|---|
| Anionic | | | | | | |
| $C_{14-18}$ α-Olefinsulfonate | 10 | 10 | 10 | 10 | 10 | 10 |
| Alkylbenzenesulfonate ($C_{10-14}$ alkyl group) | 10 | 10 | 10 | 10 | 10 | 10 |
| α-Sulfofatty acid ($C_{12-16}$) methyl ester salt | 10 | 10 | 10 | 10 | 10 | 10 |
| Beef tallow fatty acid salt | 2 | 2 | 2 | 2 | 2 | 2 |
| Nonionic | | | | | | |
| $C_{12-13}$ Alcohol ethoxylate (EOp = 20) | 5 | — | — | — | — | — |
| Nonylphenol ethoxylate (EOp = 15) | — | 5 | — | — | — | — |
| $C_{12-13}$ Alcohol EO · PO adduct (EOp = 15, POp = 5) | — | — | 5 | — | — | — |
| Coconut fatty acid dialkanol amide | — | — | — | 5 | — | — |
| Sucrose fatty acid ($C_{12-14}$) ester | — | — | — | — | 5 | — |
| Alkylamine oxide ($C_{12-14}$) | — | — | — | — | — | 5 |
| Builder | | | | | | |
| Zeolite Type A (average particle diameter 1.2 μm) | 20 | 20 | 20 | 20 | 20 | 20 |
| Sodium carbonate | 10 | 10 | 10 | 10 | 10 | 10 |

TABLE 11-continued

Detergent Particles Nos. 111-116*)

| Component | No. 111 | 112 | 113 | 114 | 115 | 116 |
|---|---|---|---|---|---|---|
| JIS No. 1 Sodium silicate | 10 | 10 | 10 | 10 | 10 | 10 |
| Enzyme | | | | | | |
| Protease (Trade name Savinase 4.0T) | 0.5 | 0.5 | 0.5 | 0.5 | 0.5 | 0.5 |
| Amylase (Trade name Termamyl 60G) | 0.2 | 0.2 | 0.2 | 0.2 | 0.2 | 0.2 |
| Lipase (Trade name Lipolase 30T) | 0.3 | 0.3 | 0.3 | 0.3 | 0.3 | 0.3 |
| Other additive | | | | | | |
| Polyethylene glycol (M sb,13 w = 6,000) | 2 | 2 | 2 | 2 | 2 | 2 |
| Sodium sulfite | 2 | 2 | 2 | 2 | 2 | 2 |
| Fluorescent agent (Trade name Tinopal CBS-X) | 0.1 | 0.1 | 0.1 | 0.1 | 0.1 | 0.1 |
| Fluorescent agent (Trade name Whitex SKC) | 0.2 | 0.2 | 0.2 | 0.2 | 0.2 | 0.2 |
| Fluorescent agent (Trade name Whitex SA) | 0.2 | 0.2 | 0.2 | 0.2 | 0.2 | 0.2 |
| Perfume (as shown in Table A before) | 0.2 | 0.2 | 0.2 | 0.2 | 0.2 | 0.2 |
| Glauber's salt | 5 | 5 | 5 | 5 | 5 | 5 |

Note:
*)Numerical values in the Table indicate compounding amounts (in % by weight).

TABLE 12

Detergent Particles Nos. 121-130*)

| | Component | No. 121 | 122 | 123 | 124 | 125 | 126 | 127 | 128 | 129 | 130 |
|---|---|---|---|---|---|---|---|---|---|---|---|
| Anionic | $C_{14-18}$ α-Olefinsulfonate | 10 | 10 | 10 | 10 | 10 | 10 | 10 | 10 | 10 | 10 |
| | Alkylbenzenesulfonate ($C_{10-14}$ alkyl group) | 10 | 10 | 10 | 10 | 10 | 10 | 10 | 10 | 10 | 10 |
| | α-Sulfofatty acid ($C_{12-18}$) methyl ester salt | 10 | 10 | 10 | 10 | 10 | 10 | 10 | 10 | 10 | 10 |
| | Beef tallow fatty acid salt | 2 | 2 | 2 | 2 | 2 | 2 | 2 | 2 | 2 | 2 |
| Nonionic | $C_{12-13}$ Alcohol ethoxylate (EOp = 20) | 2 | 2 | 2 | 2 | 2 | 2 | 2 | 2 | 2 | 2 |
| | Nonylphenol ethoxylate (EOp = 15) | 2 | 2 | 2 | 2 | 2 | 2 | 2 | 2 | 2 | 2 |
| | $C_{12-13}$ Alcohol EO ·PO adduct (EOp = 15, POp = 5) | 1 | 1 | 1 | 1 | 1 | 1 | 1 | 1 | 1 | 1 |
| | Coconut fatty acid dialkanol amide | 1 | 1 | 1 | 1 | 1 | 1 | 1 | 1 | 1 | 1 |
| | Alkylamine oxide ($C_{12-14}$) | 1 | 1 | 1 | 1 | 1 | 1 | 1 | 1 | 1 | 1 |
| Builder | Zeolite Type A (average particle diameter 1.2 μm) | 20 | 10 | 10 | 10 | 10 | 10 | 10 | 10 | 10 | 10 |
| | Sodium citrate | — | 10 | — | — | — | — | — | — | — | — |
| | Trisodium nitrolotriacetate | — | — | 10 | — | — | — | — | — | — | — |
| | Tetrasodium ethylenediaminetetraacetate | — | — | — | 10 | — | — | — | — | — | — |
| | Sodium hydroxyethanediphosphonate | — | — | — | — | 10 | — | — | — | — | — |
| | Sodium polyacryate (Mw = 5,000) | — | — | — | — | — | 10 | — | — | — | — |
| | Maleic acid/ethylene copolymer (Mw = 10,000) | — | — | — | — | — | — | 10 | — | — | — |
| | Sodium hydroxypolyacrylate (Mw = 10,000) | — | — | — | — | — | — | — | 10 | — | — |

TABLE 12-continued

Detergent Particles Nos. 121-130*)

| | Component | 121 | 122 | 123 | 124 | 125 | 126 | 127 | 128 | 129 | 130 |
|---|---|---|---|---|---|---|---|---|---|---|---|
| | α-Sulfofatty acid ($C_{16-18}$) disodium | — | — | — | — | — | — | — | — | 10 | — |
| | Sodium carbonate | 10 | 10 | 10 | 10 | 10 | 10 | 10 | 10 | 10 | 5 |
| | JIS No. 1 Sodium silicate | 10 | 10 | 10 | 10 | 10 | 10 | 10 | 10 | 10 | 10 |
| | Crystalline sodium phyllosilicate | — | — | — | — | — | — | — | — | — | 15 |
| Enzyme | Protease (Trade name Savinase 4.0T) | 0.5 | 0.5 | 0.5 | 0.5 | 0.5 | 0.5 | 0.5 | 0.5 | 0.5 | 0.5 |
| | Amylase (Trade name Termamyl 60G) | 0.2 | 0.2 | 0.2 | 0.2 | 0.2 | 0.2 | 0.2 | 0.2 | 0.2 | 0.2 |
| | Lipase (Trade name Lipolase 30T) | 0.3 | 0.3 | 0.3 | 0.3 | 0.3 | 0.3 | 0.3 | 0.3 | 0.3 | 0.3 |
| Other additive | Polyethylene glycol ($\bar{M}w$ = 6,000) | 2 | 2 | 2 | 2 | 2 | 2 | 2 | 2 | 2 | 2 |
| | Sodium sulfite | 2 | 2 | 2 | 2 | 2 | 2 | 2 | 2 | 2 | 2 |
| | Fluorescent agent (Trade name Tinopal CBS-X) | 0.1 | 0.1 | 0.1 | 0.1 | 0.1 | 0.1 | 0.1 | 0.1 | 0.1 | 0.1 |
| | Fluorescent agent (Trade name Whitex SKC) | 0.2 | 0.2 | 0.2 | 0.2 | 0.2 | 0.2 | 0.2 | 0.2 | 0.2 | 0.2 |
| | Fluorescent agent (Trade name Whitex SA) | 0.2 | 0.2 | 0.2 | 0.2 | 0.2 | 0.2 | 0.2 | 0.2 | 0.2 | 0.2 |
| | Perfume (as shown in Table A before) | 0.2 | 0.2 | 0.2 | 0.2 | 0.2 | 0.2 | 0.2 | 0.2 | 0.2 | 0.2 |
| | Glauber's salt | 5 | 5 | 5 | 5 | 5 | 5 | 5 | 5 | 5 | 5 |

Note:
*)Numerical values in the Table indicate compounding amounts (part by weight).

TABLE 13

Detergent Particles Nos. 131-134*)

| Component | 131 | 132 | 133 | 134 |
|---|---|---|---|---|
| Anionic | | | | |
| $C_{14-18}$ α-Olefinsulfonate | 10 | 10 | 10 | 10 |
| Alkylbenzenesulfonate ($C_{10-14}$ alkyl group) | 10 | 10 | 10 | 10 |
| α-Sulfofatty acid ($C_{14-18}$) methyl ester salt | 10 | 10 | 10 | 10 |
| Beef tallow fatty acid salt | 2 | 2 | 2 | 2 |
| Nonionic | | | | |
| $C_{12-13}$ Alcohol ethoxylate ($\bar{EOp}$ = 20) | 2 | 2 | 2 | 2 |
| Nonylphenol ethoxylate (EOp = 15) | 2 | 2 | 2 | 2 |
| $C_{12-13}$ Alcohol EO · PO adduct (EOp = 15, POp = 5) | 1 | 1 | 1 | 1 |
| Coconut fatty acid dialkanol amide | 1 | 1 | 1 | 1 |
| Alkylamine oxide ($C_{12-14}$) | 1 | 1 | 1 | 1 |
| Builder | | | | |
| Zeolite Type A (average particle diameter 1.2 μm) | 20 | 20 | 20 | 20 |
| Sodium carbonate | 10 | 10 | 10 | 10 |
| JIS No. 1 Sodium silicate | 10 | 10 | 10 | 10 |

TABLE 13-continued

Detergent Particles Nos. 131-134*)

| Component | 131 | 132 | 133 | 134 |
|---|---|---|---|---|
| Enzyme | | | | |
| Protease (Trade name Savinase 4.0T) | 0.5 | 0.5 | 0.5 | 0.5 |
| Amylase (Trade name Termamyl 60G) | — | 0.5 | — | — |
| Cellulase (Trade name Celluzyme SP-227) | — | — | 0.5 | — |
| Lipase (Trade name Lipolase 30T) | — | — | — | 0.5 |
| Other additive | | | | |
| Polyethylene glycol ($\bar{M}w$ = 6,000) | 2 | 2 | 2 | 2 |
| Sodium sulfite | 2 | 2 | 2 | 2 |
| Fluorescent agent (Trade name Tinopal CBS-X) | 0.1 | 0.1 | 0.1 | 0.1 |
| Fluorescent agent (Trade name Whitex SKC) | 0.2 | 0.2 | 0.2 | 0.2 |
| Fluorescent agent (Trade name Whitex SA) | 0.2 | 0.2 | 0.2 | 0.2 |
| Perfume (as shown in Table A before) | 0.2 | 0.2 | 0.2 | 0.2 |
| Glauber's salt | 5 | 5 | 5 | 5 |

Note:
*)Numerical values in the Table indicate compounding amounts (part by weight).

TABLE 14

Detergent Particles Nos. 135-142*)

| | Component | 135 | 136 | 137 | 138 | 139 | 140 | 141 | 142 |
|---|---|---|---|---|---|---|---|---|---|
| Anionic | $C_{14-18}$ α-Olefinsulfonate | 10 | 10 | 10 | 10 | 10 | 10 | 10 | 10 |
| | Alkylbenzenesulfonate ($C_{10-14}$ alkyl group) | 10 | 10 | 10 | 10 | 10 | 10 | 10 | 10 |
| | α-Sulfofatty acid ($C_{12-16}$) methyl ester salt | 10 | 10 | 10 | 10 | 10 | 10 | 10 | 10 |
| | Beef tallow fatty acid salt | 2 | 2 | 2 | 2 | 2 | 2 | 2 | 2 |
| Nonionic | $C_{12-13}$ Alcohol ethoxylate ($\bar{EOp}$ = 20) | 2 | 2 | 2 | 2 | 2 | 2 | 2 | 2 |
| | Nonylphenol ethoxylate (EOp = 15) | 2 | 2 | 2 | 2 | 2 | 2 | 2 | 2 |
| | $C_{12-13}$ Alcohol EO · PO adduct (EOp = 15, POp = 5) | 1 | 1 | 1 | 1 | 1 | 1 | 1 | 1 |
| | Coconut fatty acid dialkanol amide | 1 | 1 | 1 | 1 | 1 | 1 | 1 | 1 |
| | Alkylamine oxide ($C_{12-14}$) | 1 | 1 | 1 | 1 | 1 | 1 | 1 | 1 |
| Builder | Zeolite Type A (average particle diameter 1.2 μm) | 20 | 20 | 20 | 20 | 20 | 20 | 20 | 20 |
| | Sodium carbonate | 10 | 10 | 10 | 10 | 10 | 10 | 10 | 10 |
| | JIS No. 1 Sodium silicate | 10 | 10 | 10 | 10 | 10 | 10 | 10 | 10 |
| Enzyme | Protease (Trade name Savinase 4.0T) | 0.5 | 0.5 | 0.5 | 0.5 | 0.5 | 0.5 | 0.5 | 0.5 |
| | Amylase (Trade name Termamyl 60G) | 0.2 | 0.2 | 0.2 | 0.2 | 0.2 | 0.2 | 0.2 | 0.2 |
| | Lipase (Trade name Lipolase 30T) | 0.3 | 0.3 | 0.3 | 0.3 | 0.3 | 0.3 | 0.3 | 0.3 |
| Other additive | Polyethylene glycol ($\bar{M}w$ = 6,000) | — | 2 | — | — | — | — | — | — |
| | Sodium sulfite | 2 | 2 | 2 | 2 | 2 | 2 | 2 | 2 |
| | Carboxymethyl cellulose | — | — | 2 | — | — | — | — | — |
| | Polyvinyl alcohol ($\bar{M}w$ = 20,000) | — | — | — | 2 | — | — | — | — |
| | p-Toluenesulfonate | — | — | — | — | 2 | — | — | — |
| | Di-hardened beef tallow alkyl dimethylammonium chloride | — | — | — | — | — | 5 | — | 2 |
| | Smectites (Trade name "Yellow Stone") | — | — | | — | — | — | 5 | 5 |
| | Fluorescent agent (Trade name Tinopal CBS-X) | 0.1 | 0.1 | 0.1 | 0.1 | 0.1 | 0.1 | 0.1 | 0.1 |
| | Fluorescent agent (Trade name Whitex SKC) | 0.2 | 0.2 | 0.2 | 0.2 | 0.2 | 0.2 | 0.2 | 0.2 |
| | Fluorescent agent (Trade name Whitex SA) | 0.2 | 0.2 | 0.2 | 0.2 | 0.2 | 0.2 | 0.2 | 0.2 |
| | Perfume (as shown in Table A before) | 0.2 | 0.2 | 0.2 | 0.2 | 0.2 | 0.2 | 0.2 | 0.2 |

TABLE 14-continued

| Detergent Particles Nos. 135-142*) | | | | | | | | |
|---|---|---|---|---|---|---|---|---|
| | No. | | | | | | | |
| Component | 135 | 136 | 137 | 138 | 139 | 140 | 141 | 142 |
| Glauber's salt | 5 | 5 | 5 | 5 | 5 | 5 | 5 | 5 |

Note:
*)Numerical values in the Table indicate compounding amounts (part by weight).

REFERENTIAL EXAMPLE 1

Eighty (80) grams of a 15% aqueous boric acid solution at 90° C. and 20 g of an aqueous water glass No. 1 solution (of a concentration of 15% in terms of $SiO_2$) at 90° C. were mixed. Immediately the whole turned into the form of gel.

What is claimed is:

1. A composition comprising granulated sodium percarbonate coated with boric acid and an alkali metal silicate, formed by separately spraying an aqueous boric acid solution and an aqueous alkali metal silicated solution onto sodium percarbonate particles kept in a fluidized state to coat the particles with an aqueous solution of the boric acid and the alkali metal silicate.

2. A composition according to claim 1 wherein the amount of boric acid is 0.3-20% by weight relative to sodium percarbonate and the amount of the alkali metal silicate is 0.1-10% by weight in terms of $SiO_2$ relative to sodium percarbonate.

3. A composition according to claim 1 wherein the average particle diameter of the sodium percarbonate particles to be coated is 100-2,000 μm.

4. A composition according to claim 1 wherein the temperature of the sodium percarbonate in fluidized state is maintained at 30°-100° C.

5. A composition according to claim 1 wherein the sodium percarbonate particles are incorporated into the composition in a proportion of 1-40% by weight relative to the composition.

* * * * *